INVENTOR.
Henry J. Kuhlman,
BY Bair & Freeman
ATTORNEYS.

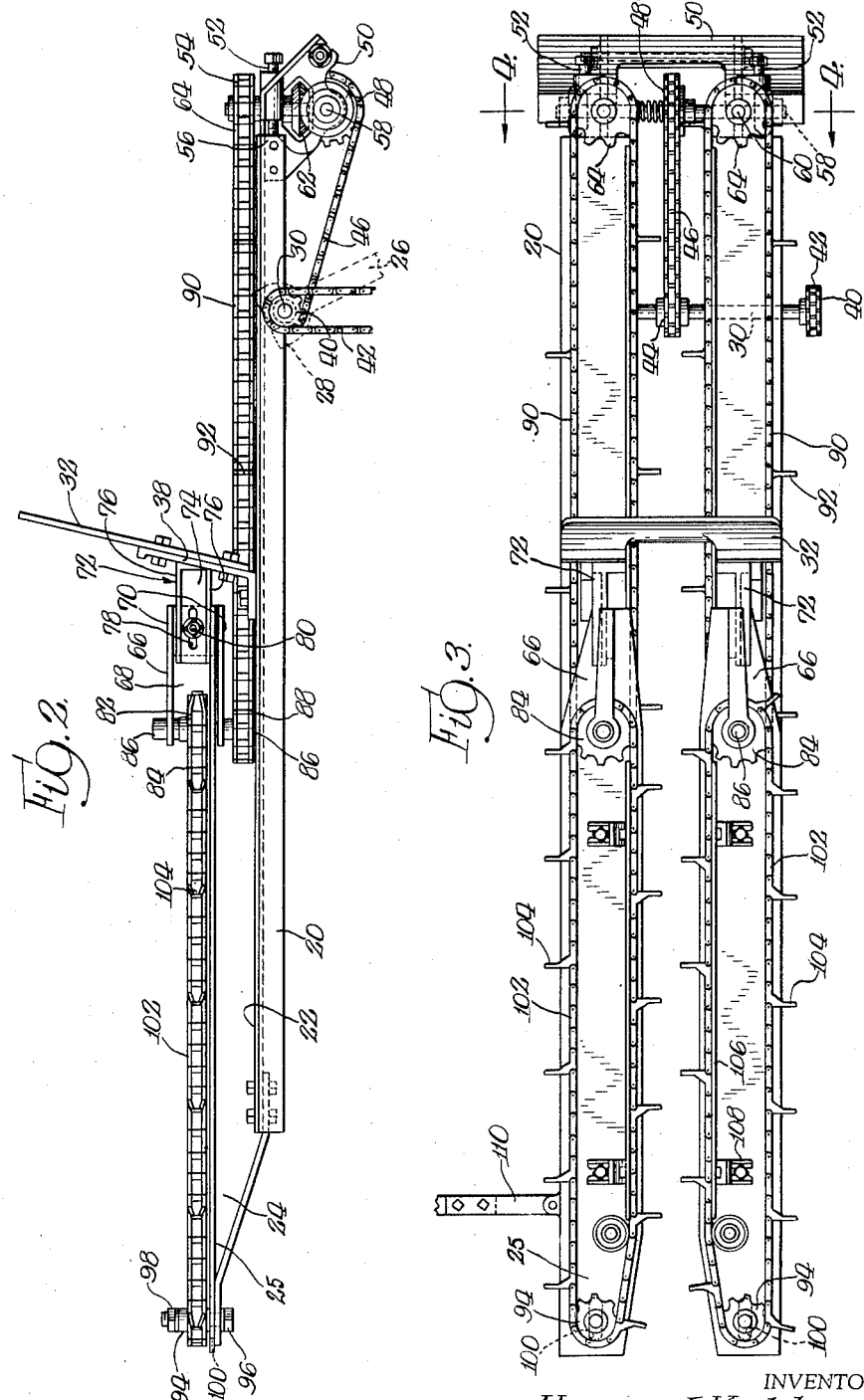

Patented Nov. 10, 1942

2,301,550

UNITED STATES PATENT OFFICE 2,301,550

CORN HARVESTER

Henry J. Kuhlman, Waterloo, Iowa, assignor to Kuhlman Manufacturing Company, Waterloo, Iowa, a corporation of Iowa Application August 3, 1940, Serial No. 350,318

6 Claims. (Cl. 56—18)

My invention relates to corn harvesting devices and particularly corn harvesters which are power driven such as by use of a tractor upon which the harvester may be mounted.

Among the objects of my invention is to provide a new and improved corn harvester having gathering chains and conveying chains for respectively drawing corn stalks into the device and then for propelling picked corn along the machine, which are so mounted upon the harvester that they may be quickly and readily adjusted as to tension. In addition, it is among the objects to provide novel mountings for the chains such that any strain upon one chain or the other tending to vary the tension on that chain will at the same time be balanced by the tension exerted by the other chain.

Another object of my invention is to provide a new and improved corn harvester consisting of a framework for picker and husker rolls suspended at the side of a tractor in such a manner that the frame is pivoted about a point of support which at the same time is the location of a shaft connected to a power take-off of the tractor, providing thereby an axis stationary with respect to distance and alignment with respect to the power take-off and stationary also with respect to its position on the frame, thereby providing a constant position for the application of power.

Another object still is to provide a corn harvesting device for mounting upon a tractor which has mounted thereon a set of picker and husker rolls and pairs of gathering chains cooperable with pairs of conveying chains on opposite sides of the rolls, each chain being independently adjustable as to tension by shifting the position of wheels at either end, about which the chain is reeved.

Still another object is to provide in a corn harvester a set of chains acting end to end wherein power from one is transmitted to the other by a pin or shaft and wheels about which the ends of the chain are reeved, the pin being mounted upon a guided yoke shiftable endwise in either direction and adjustably attached to the frame so that by shifting the yoke in one direction or another the tension on the two adjacent chains can be balanced.

Still another object is to provide a corn harvesting machine including snapping and husking rolls, gathering chains and conveyor chains, which is simply constructed and capable of a quick and easy adjustment by a successive positioning of the wheels supporting the ends of the chains.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 2 is a side elevational view of the chains used on one side of the harvester mechanism.

Figure 3 is a top plan view of the chain construction used in the mechanism.

Figure 1:
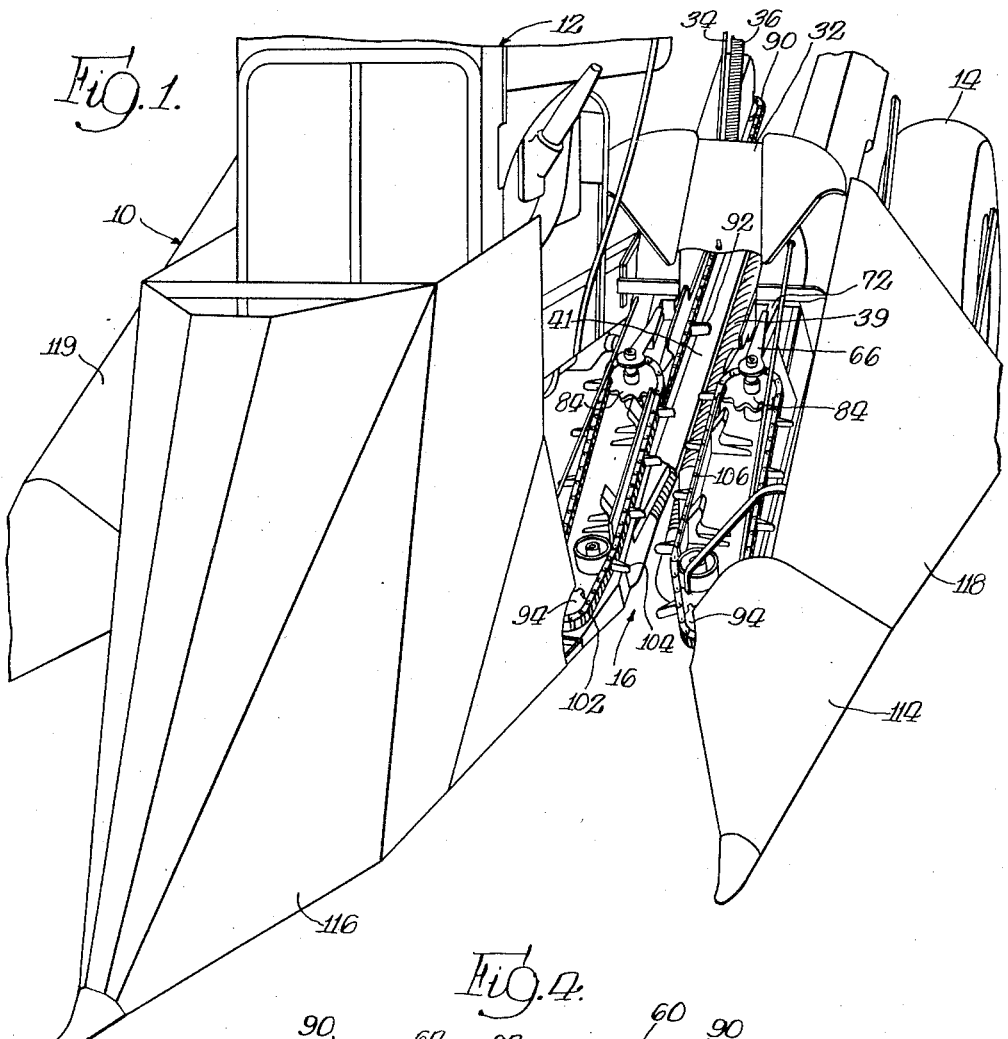
Figure 1 is a front perspective view of a corn harvester mounted on a tractor with a portion of the casing removed showing the harvester mechanism.
Figure 4:
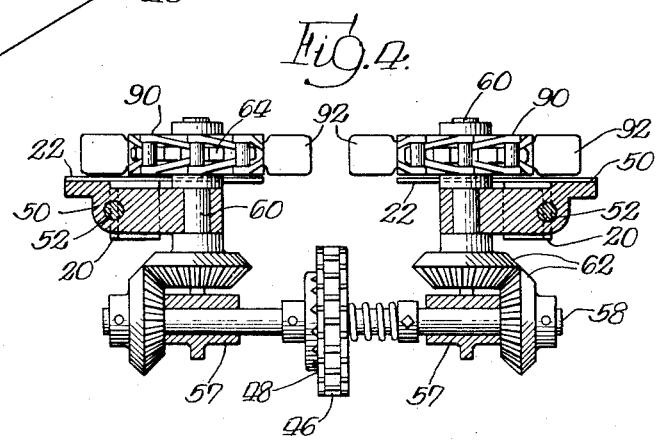
Figure 4 is a cross section taken on the line 4—4 of Figure 3.

In the construction of corn harvester machines which are to be used by farmers in the field who are not especially skilled in the assembly and operation of intricate mechanical devices, it is necessary to make mechanisms such as harvester machines as simple as possible. Although these machines may often be assembled originally by men skilled in their construction, nevertheless frequent adjustments often become necessary in order to keep the mechanisms properly toned for efficient performance and since these adjustments invariably need be made by the farmer under operating conditions the utmost simplicity becomes desirable.

When a harvester is at work in a field of corn it is highly advisable to continue oeration until all of the crop has been gathered. Therefore, a simplified construction which will permit the operator himself to make adjustments without materially retarding the harvesting of a crop is a feature especially desirable.

For details of corn harvesters of which this device forms an improvement, reference is made to Patents Nos. 2,139,165, 2,169,070, 2,180,594, 2,180,595 and 2,284,909.

In the embodiment chosen to illustrate my invention there are provided all of the necessary mechanical movements in a machine in which the separate parts have been reduced as far as possible to a minimum and in which as near as possible forces will be balanced so as to preserve any adjustment which might be made.

In the drawings a corn harvesting machine is indicated by the character 10 mounted upon a tractor 12. A rear traction wheel 14 is shown to the left of Figure 1. A corn harvesting device 16 is located on each side of the tractor but since they are identical in construction the device on one side only will be described in detail.

The corn harvesting device itself consists of an elongated frame 20 made of angles or channels having a plate 22 secured thereto and a longitudinal upward extending rib 24 topped by a plate 25. The frame as a unit is mounted upon the tractor by means of a bracket 26 which is customarily positioned a little above and slightly in advance of the axle of the traction wheels 14.

The bracket has a Y-shaped end 28 with the opening extending upward and a shaft 30, secured upon the frame, rests within the arms of the Y. The weight of the frame is therefore supported upon the tractor by the bracket and the frame is allowed to move pivotally about the axis of the shaft 30.

In order that the frame may be further supported there is provided an arch 32 extending from one side of the frame to the other as shown in Figure 1 and the arch in turn is carried by a rod 34 and spring 36, the particular formation of which is not a part of this invention but which is suggested in the form shown for the purpose of completeness.

The rod and spring are designed to be carried by a bracket, not shown, secured to the tractor. The arch in turn is bolted to an angle bracket 38 on the frame. Picker rolls 39 and 41 extend obliquely downward and are rotatably supported in that position as shown in Figure 1. In tractors of the type commonly used for agicultural work there is customarily provided a power take-off frequently near the rear traction wheels. In the setup shown in the drawing the power take-off is presumed to be adjacent to and slightly below the rear traction axle but is not shown since the precise position is not material.

The shaft 30 previously described is provided with a sprocket 40 which is connected to the power take-off by means of a drive chain 42. On the shaft there is also a second sprocket 44 located approximately midway between the edges of the frame and this sprocket is connected by means of a second drive chain 46 to a third sprocket 48.

At the rear of the frame there is a shaft mounting 50 which is secured endwise upon the frame by means of screws 52 carried within bosses 54 of the mounting. The screws extend through the bosses into contact with the end of the vertical member of the angle 20. A pair of screws 52 are used for the sake of stability and rigidity and are shown one on each side of the framework.

Suitably journalled in bearings 57 on the mounting is a second shaft 58 and it is upon this shaft that the third sprocket, here termed a drive sprocket, is secured. It will be therefore apparent that the tension of chain 46 can be adjusted by means of positioning the mounting forwardly or rearwardly by adjustment of the screws 52.

On each side of the framework in the mounting is a vertically positioned pin 60 connected to the second shaft by a set of beveled gears 62 which transfer the power from the shaft to the pins. The pins in turn are journalled in a vertical position and maintain this position constant relative to the mounting. On the upper side of each pin is provided a wheel 64 and it is from this wheel that power is taken to drive a portion of the harvester mechanism about to be described.

Substantially midway between the ends of the frame there is provided a yoke 66 which has a web 68 and upper and lower plates 70. A projection 72 forming part of the bracket 38 extends forwardly into contact with the yoke. This projection has a web 74 with upper and lower flanges 76 at the sides thereof. The flanges fit slidably within the edges of the plates 70 while the respective webs of the projection and the yoke slide adjacent to each other, thereby maintaining a permanent alignment of the yoke with respect to the frame.

In the web of the yoke there is provided a slot 78, and a bolt and nut 80 secured in the web of the yoke extends through the slot. By loosening the nut on the bolt the position of the yoke can be changed in a forwardly or rearwardly direction wherein it may be secured by a successive tightening of the nut and bolt.

At the forward end the web 68 of the yoke is provided with a recess 82 and in the recess is positioned an upper intermediate wheel 84 which rotates upon a pin 86 held by the yoke. The pin extends downwardly below the lower plate and on the lower end is provided another lower intermediate wheel 88, both of the wheels being thereby carried by the pin 86 and its supporting yoke.

A conveyor chain 90 is reeved around a lower intermediate wheel 88 and the previously described wheel 64. This chain has upon it fingers 92 which when the chain is operated perform the function of conveying ears of corn upward relative to the frame through the valley between the rollers 39 and 41.

At the front end of the frame or to the left as viewed in Figure 2 there is provided an idling wheel 94, secured to the frame by means of a bolt 96 and nut 98. The bolt projects through a slot 100 in the plate 25 and when loosened can be shifted forwardly or rearwardly a short distance relative to the frame, thereby permitting a desired positioning of the wheel 94.

Reever around the wheel 94 and the wheel 84 previously described is a gathering chain 102 provided with gathering fingers 104. When this chain is operated the fingers serve the purpose of drawing standing stalks of corn into the harvester device.

Guide plates 106 supported by brackets 108 assist in the positioning of the gathering chains. A cross brace 110 aligns the front end of the frame on one side of the tractor with respect to a corresponding frame on the other side. The snapping and picking rolls 39 and 41 are shown in Figure 1 in their position relative to the gathering and conveying chains but have been omitted from the detailed Figures 2 and 3 for the sake of clarity.

The entire mechanism as shown in Figure 1 is sheathed by lateral toe pieces 114, a central toe piece 116 and gathering chain guards 118 and 119, parts of which have been removed to reveal the harvester mechanism.

In operation, power is transmitted from the power take-off, not shown, first through the drive chains 42 to the shaft 30. These chains can be fixed in length since the position of the shaft 30 does not change. Drive chains 46 next convey the power to the second shaft 58. When these chains are placed in position they may be slack and after positioning the proper tension can be applied by shifting the mounting 50 rearwardly by manipulation of the screws 52. Positioning the mounting in this manner establishes an initial position for the wheel 64.

Next, the yoke 66 can be adjusted and secured in place by the bolt 80 so that the conveyor chain 90 will have a proper tension applied to it. After this operation is completed the forward idling wheel 94 can be adjusted so that a proper tension will be applied to the gathering chain 106.

The same operations are applied on both sides of the frame 20 to properly tension conveying chains and gathering chains after the mounting 50 has been duly adjusted.

There has thus been provided a corn harvester mechanism providing an extremely simple construction and adjustment of conveyor and gathering chains which are readily accessible for readjustment after the machine has been placed in operation.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a corn harvester device including a tractor having a power take-off thereon, the combination of an elongated harvester frame having a shaft pivotally supporting said frame on the tractor, a sprocket on said shaft and a drive chain from the sprocket to the power take-off, a second sprocket on said shaft, a shaft mounting including a second shaft at the rear of the frame having a third sprocket thereon and a chain connecting said last named sprockets, said mounting having a pair of pins, said pins being each geared to said second shaft and having a drive wheel thereon, and an adjustable connection between said mounting and the frame for adjusting the tension on the drive chain, a yoke substantially midway on each side of said frame having an adjustable connection thereto shiftable in an endwise direction, a pin carried by each said yoke having upper and lower wheels thereon, a conveyor chain connecting the lower of said wheels to the drive wheel adjustable as to tension by movement of the yoke, a front idling wheel adjustably mounted on the forward end of the frame and a gathering chain connecting the upper wheel and the idling wheel adjustable as to tension by movement of said idling wheel and said upper wheel.

2. In a corn harvester device including a tractor having a power take-off thereon, the combination of an elongated harvester frame having a shaft pivotally supporting said frame on the tractor, a sprocket on said shaft and a drive chain from the sprocket to the power take-off, a second sprocket on said shaft, a shaft mounting including a second shaft at the rear of the frame having a third sprocket thereon and a chain connecting said last named sprockets, a pair of pins on said mounting having bevel gears meshing respectively with bevel gears on the second shaft and having a drive wheel thereon, a pair of adjustable connections between said mounting and the frame at opposite sides of the mounting for adjusting the tension on the drive chain, a yoke element substantially midway on each side of said frame and a bracket element for supporting the yoke, an adjustable connection between said elements comprising a slot in one and a threaded projection in the other adapted to permit the yoke to shift in an endwise direction, a pin carried by each said yoke having upper and lower wheels thereon, a conveyor chain connecting the lower of said wheels to the drive wheel adjustable as to tension by movement of the yoke, a front idling wheel adjustably mounted on the forward end of the frame and a gathering chain connecting the upper wheel and the idling wheel adjustable as to tension by movement of said idling wheel and said upper wheel.

3. A power actuated corn harvester comprising a frame, a pair of rotatable corn harvesting rolls for snapping ears of corn from the stalk mounted on the frame, a gathering chain for drawing stalks between the rolls, a conveying chain for moving picked corn ears along the rolls and a set of wheels for holding each of said chains including a front idling wheel for the gathering chain mounted on the frame, an upper intermediate wheel for the gathering chain, a yoke and a pin journalled in the yoke non-rotatably attached to the upper wheel for supporting said gathering chain, a lower intermediate driven wheel non-rotatably mounted on the pin and a drive wheel for together holding said conveying chain, said drive wheel being rotatably mounted on the frame, said yoke having an adjustable attachment securing it to the frame adapted to affix the yoke in either a forward or reversely adjusted position relative to the frame to set the tension on said gathering and conveying chains.

4. A power actuated corn harvester comprising a vehicle for transporting said harvester over the ground, a frame pivotally supported by the vehicle, a pair of corn harvesting rolls rotatably mounted on the frame for snapping ears of corn from the stalk, a gathering chain for drawing stalks between the rolls and a conveying chain for moving picked corn ears along the rolls, and a set of wheels for holding each of said chains including a front idling wheel for each gathering chain having an adjustable mounting securing it to the frame and varying the tension of said chain, an upper intermediate wheel for the gathering chain, a yoke and a pin journalled therein non-rotatably secured to the upper intermediate wheel for supporting said upper intermediate wheel, a lower intermediate driven wheel non-rotatably mounted on the pin and a drive wheel for together holding said conveying chain, said drive wheel being rotatably mounted on the frame, means for adjustably changing the position of said drive wheel on the frame for varying the tension on the conveying chain, said yoke having an adjustable mounting on the frame adapted to be moved in either forward or reverse direction relative to the idling and driving wheels to vary the tension on both gathering and conveying chains.

5. In a corn harvester including a power vehicle for propelling the harvester and a drive connection between said vehicle and said harvester, the combination of a harvester frame pivotally supported upon the tractor, a pair of corn harvesting rolls rotatably mounted on the frame for snapping ears of corn from the stalk, a set of chains on each side of the rolls including a gathering chain for drawing stalks between the rolls and a conveying chain for moving picked corn ears along the rolls, and a set of wheels for holding each set of chains, said set of wheels including a front idling wheel for the gathering chain having an adjustable mounting securing it to the frame, an upper intermediate wheel for the gathering chain, there being a yoke and a pin journalled in the yoke non-rotatably secured to and supporting said upper wheel above the frame, a lower intermediate wheel non-rotatably mounted on the pin above the frame and a drive wheel for holding said conveying chain, said drive wheel being mounted on a pin, and a mounting for the pin adjustably secured to the frame, a guide member on the frame and a complementary guide member on the yoke slidable forwardly and rearwardly relative to each other preserving the alignment of the yoke with respect to the frame and an adjustable connection between said member for holding the members in either a forward or rearward position to control the tension simultaneously on said gathering and conveying chains.

6. In a power actuated two-row corn harvester, the combination of a tractor having a relatively narrow body, rear traction wheels positioned relatively wide apart and spaced from the body, and a pair of corn harvesters one on each side of the tractor comprising a frame, a stationary pivot support on the tractor adjacent the traction wheel axle and a shaft therein mounted inwardly from one end of the frame for pivotally supporting said frame between the traction wheel and the tractor body, a sprocket on said shaft and a power take-off on the tractor having a drive connection therewith, a set of wheels on the frame and chains carried by the wheels for handling the crop, said wheels being adjustable in position to vary the tension on the chains, one of said wheels being shiftable on said frame through directions in substantially constant alignment with said sprocket, and a drive connection between the sprocket and the wheel subject to tension adjustment by the positioning of said wheel.

HENRY J. KUHLMAN.